UNITED STATES PATENT OFFICE.

JOHN WALTER MEADER, OF INDIANAPOLIS, INDIANA, ASSIGNOR TO THE ELI LILLY AND COMPANY, OF INDIANAPOLIS, INDIANA, A CORPORATION.

CEPHAELIN ALLYL ETHER AND PROCESS FOR MAKING SAME.

1,219,575.  Specification of Letters Patent.  Patented Mar. 20, 1917.

No Drawing.  Application filed January 25, 1916.  Serial No. 74,257.

*To all whom it may concern:*

Be it known that I, JOHN WALTER MEADER, a citizen of the United States, residing at Indianapolis, in the county of Marion and State of Indiana, have invented a new and useful Cephaelin Allyl Ether and Process for Making Same, of which the following is a specification.

This invention relates to the previously unknown cephaelin allyl ether, to which may be given the formula $C_{28}H_{37}O_3N_2OC_3H_5$ in which the hydrogen of the hydroxyl group of cephaelin has been replaced by an allyl group.

This compound is a valuable medicinal product. Its uses are similar to those of emetin and somewhat larger doses than those of that product may be administered owing to the less toxicity of the present compound.

This compound may be prepared by treating cephaelin with an alkali metal and an allyl haloid and isolating the cephaelin allyl ether by suitable methods. The process in detail may be carried out as follows:

46.6 grams of cephaelin and 4.6 grams of sodium are dissolved in about 400 c. c. of absolute alcohol, about 16 grams of allyl bromid added, and the solution boiled under a reflux condenser for at least two hours. Cephaelin allyl ether which now exists in solution is isolated by recovering the alcohol, dissolving in dilute hydrochloric acid, making ammoniacal and extracting with ether. The ether solution of cephaelin allyl ether and unchanged cephaelin is extracted with an excess of dilute caustic soda solution to remove the cephaelin and evaporated to dryness on a water bath. The compound may be further purified by dissolving in an acid, crystallizing as a salt, dissolving in water, making ammoniacal, extracting with ether, recovering the ether and drying in vacuum.

In the above process, potassium may be substituted for sodium and allyl iodid for allyl bromid. The absolute alcohol may be replaced by any other suitable solvent, for instance amyl alcohol.

Cephaelin allyl ether is a varnish like substance easily soluble in alcohol, ether, and chloroform. It dissolves in acids to form salts. The hydrobromid of cephaelin allyl ether crystallizes as white needles. The hydrochlorid and nitrate of cephaelin allyl ether are also crystalline.

What I claim is:

1. The allyl ether of cephaelin.
2. A monoallyl derivative of cephaelin.
3. An allyl compound of cephaelin containing essentially the atomic aggroupment $C_{28}H_{37}O_3N_2OC_3H_5$.
4. The process of producing an allyl ether of cephaelin comprising adding to cephaelin an alkali metal, an allyl haloid and a solvent.
5. The process of producing cephaelin allyl ether by treating cephaelin with sodium ethylate and allyl bromid.
6. The process of producing an allyl ether of cephaelin which comprises treating cephaelin with an alkali metal alcoholate and an allyl haloid.

In witness whereof, I, JOHN WALTER MEADER, have hereunto set my hand at Indianapolis, Indiana, this 24th day of January, A. D. nineteen hundred and sixteen.

JOHN WALTER MEADER.